(12) United States Patent
Wade

(10) Patent No.: US 10,625,408 B2
(45) Date of Patent: Apr. 21, 2020

(54) SPECIAL SEMI-TRACTOR TRUCK AND TRAILER TOOL CALLED HUCKLEBERRYS HAMMER

(71) Applicant: Michael L Wade, Anderson, IN (US)

(72) Inventor: Michael L Wade, Anderson, IN (US)

(*) Notice: Subject to any disclaimer, the term of this patent is extended or adjusted under 35 U.S.C. 154(b) by 186 days.

(21) Appl. No.: 15/186,454

(22) Filed: Jun. 18, 2016

(65) Prior Publication Data
US 2017/0043468 A1   Feb. 16, 2017

Related U.S. Application Data

(60) Provisional application No. 62/204,402, filed on Aug. 12, 2015.

(51) Int. Cl.
| | |
|---|---|
| *B25F 1/00* | (2006.01) |
| *B25F 1/04* | (2006.01) |
| *B25D 1/14* | (2006.01) |
| *B25B 27/04* | (2006.01) |
| *B60C 27/00* | (2006.01) |
| *B25D 1/00* | (2006.01) |
| *B25D 1/16* | (2006.01) |

(52) U.S. Cl.
CPC .............. *B25F 1/006* (2013.01); *B25B 27/04* (2013.01); *B25D 1/00* (2013.01); *B25D 1/16* (2013.01); *B25F 1/04* (2013.01); *B60C 27/003* (2013.01); *B25D 2250/171* (2013.01); *B25D 2250/295* (2013.01)

(58) Field of Classification Search
CPC ... B25F 1/006; B25F 1/04; B25D 1/16; B25D 1/00; B25D 1/04; B25D 2250/295; B25D 2250/171; B60C 27/003; B25B 27/04
See application file for complete search history.

(56) References Cited

U.S. PATENT DOCUMENTS

| 4,050,107 | A | 9/1977 | Parma | |
|---|---|---|---|---|
| D330,494 | S | 10/1992 | Eagle, Jr. | |
| 5,326,144 | A | 7/1994 | Forcier | |
| 5,344,201 | A | 9/1994 | Offin | |
| 5,626,063 | A | 5/1997 | Kosab | |
| 6,279,932 | B1 | 8/2001 | White et al. | |
| 6,322,091 | B1 | 11/2001 | Lindley | |
| 6,375,162 | B1 * | 4/2002 | Johnson | B66F 19/00 254/131 |
| 6,634,047 | B2 | 10/2003 | Rowland | |

(Continued)

*Primary Examiner* — Joseph J Hail
*Assistant Examiner* — J Stephen Taylor
(74) *Attorney, Agent, or Firm* — John D. Ritchison; Ritchison Law Offices, PC

(57) ABSTRACT

A device for Semi-truck and trailer applications. It is a tool used by truck operator's release a fifth wheel pins of a tractor/trailer assembly or the wheel adjustments and tandem axle trailer pin extractor apparatus. Also it is used as a tool for allowing uncoupling/decoupling of a trailer from a tractor and for shifting the locking pins in the undercarriage of a tandem axle trailer when it is desired to shift the position of the tandem axles relative to the trailer body. The tool is made of a hammer assembly with a spike head, shaft and wedge; a pipe structure handle with a taper at one end for attaching to assembly and a way for attaching to a cap and a way to attach the hammer assembly to the pipe structure handle. It has an extendable hook assembly with a hook at one end of an adjustable tube.

11 Claims, 6 Drawing Sheets

(56) References Cited

U.S. PATENT DOCUMENTS

Figure 2:
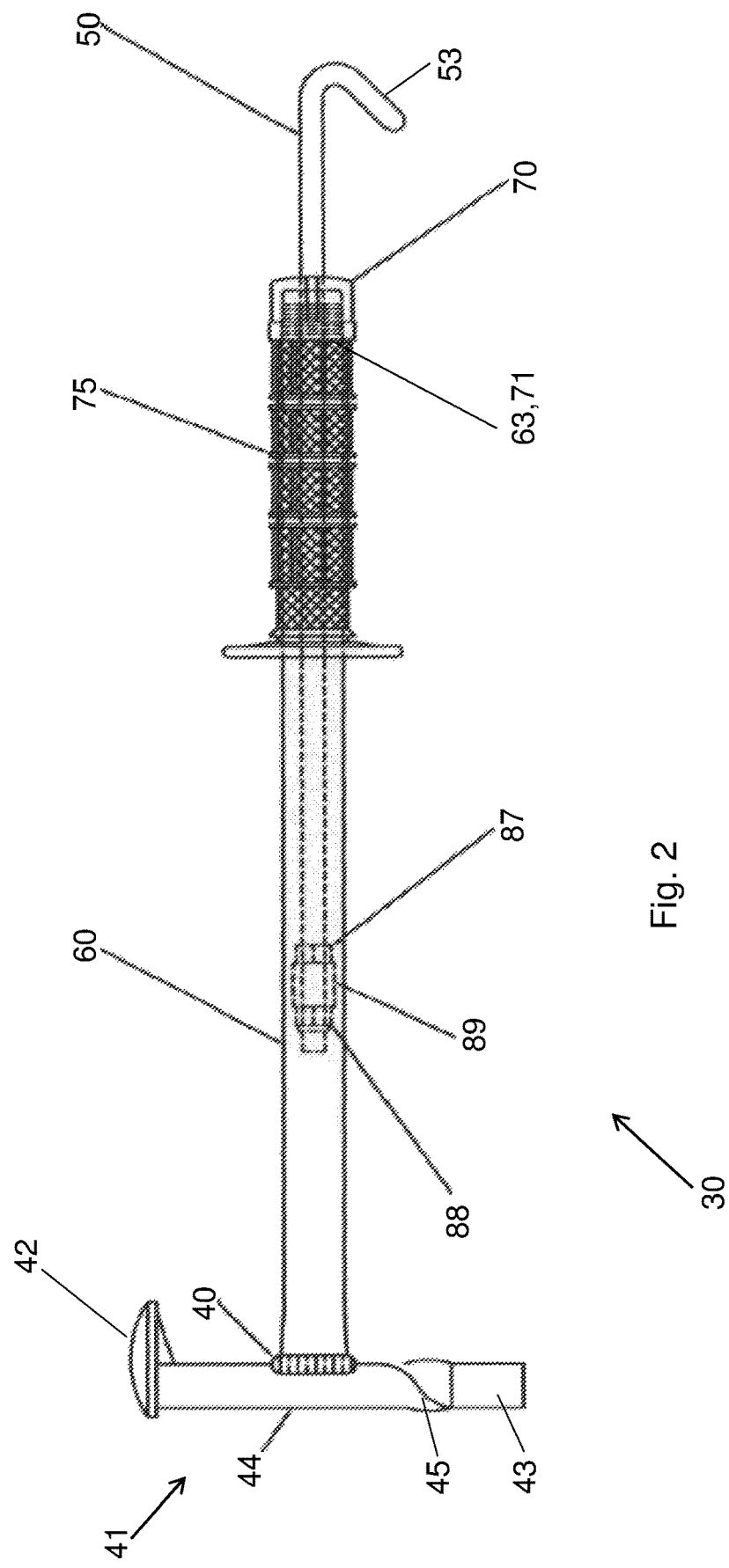

| | | | |
|---|---|---|---|
| 6,935,664 B2 | 8/2005 | McGrew et al. | |
| 7,159,260 B2 * | 1/2007 | Hansen | B25D 1/04 |
| | | | 7/100 |
| 7,347,467 B2 | 3/2008 | Theobald | |
| D566,495 S | 4/2008 | Hackmann | |
| 8,210,584 B2 * | 7/2012 | Hiltz | B62D 53/0857 |
| | | | 294/175 |
| 2013/0025102 A1 * | 1/2013 | Barnhart | B25F 1/006 |
| | | | 29/239 |
| 2014/0173830 A1 * | 6/2014 | Arthur | B25F 1/006 |
| | | | 7/146 |

* cited by examiner

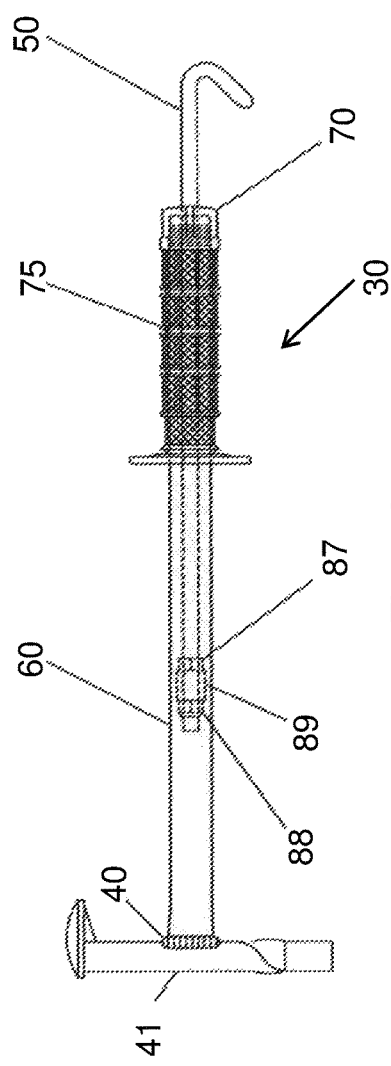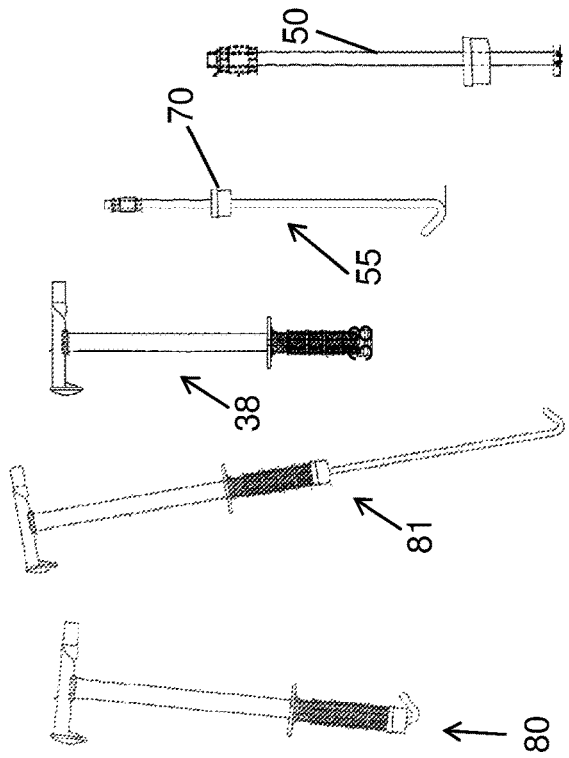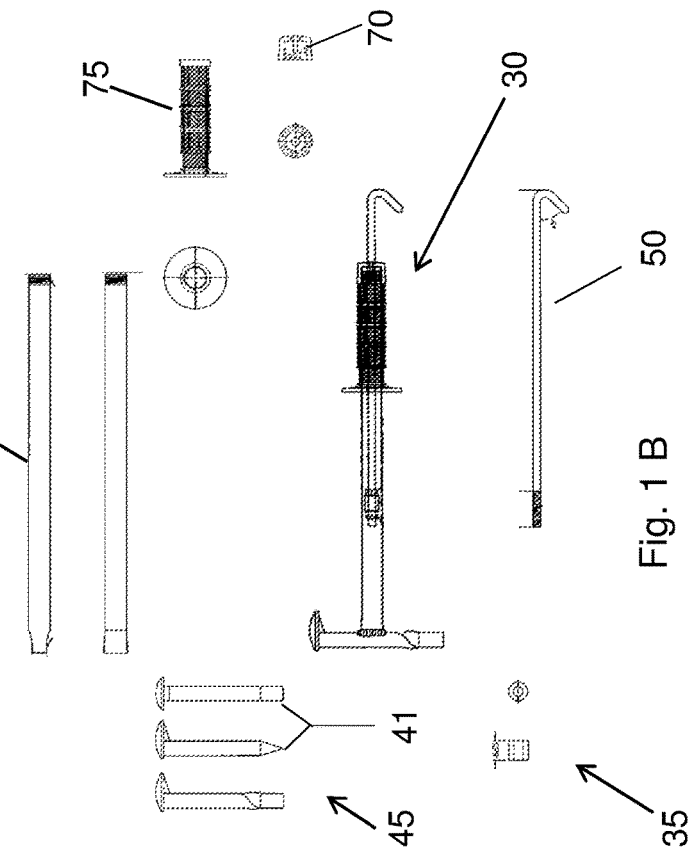

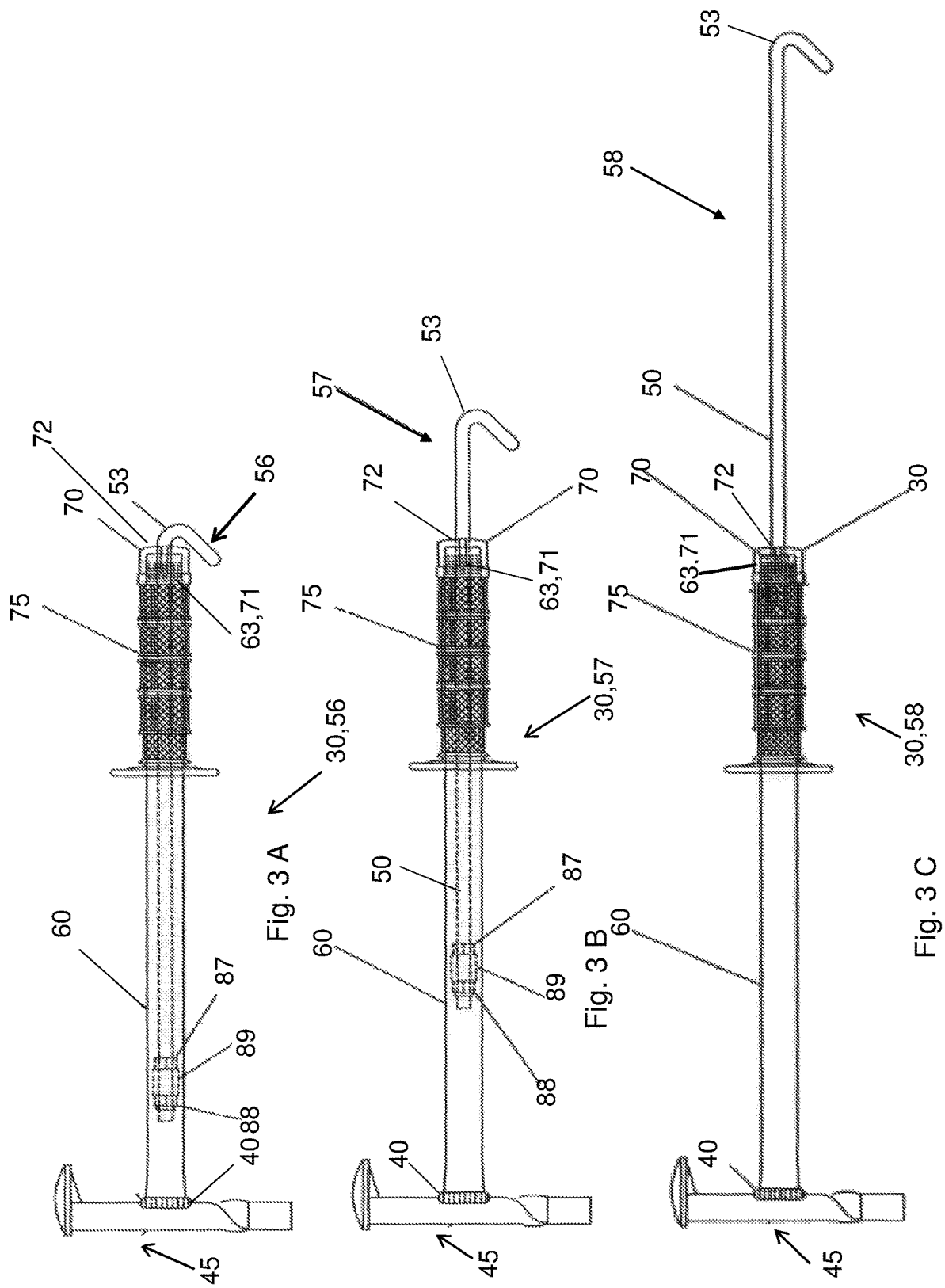

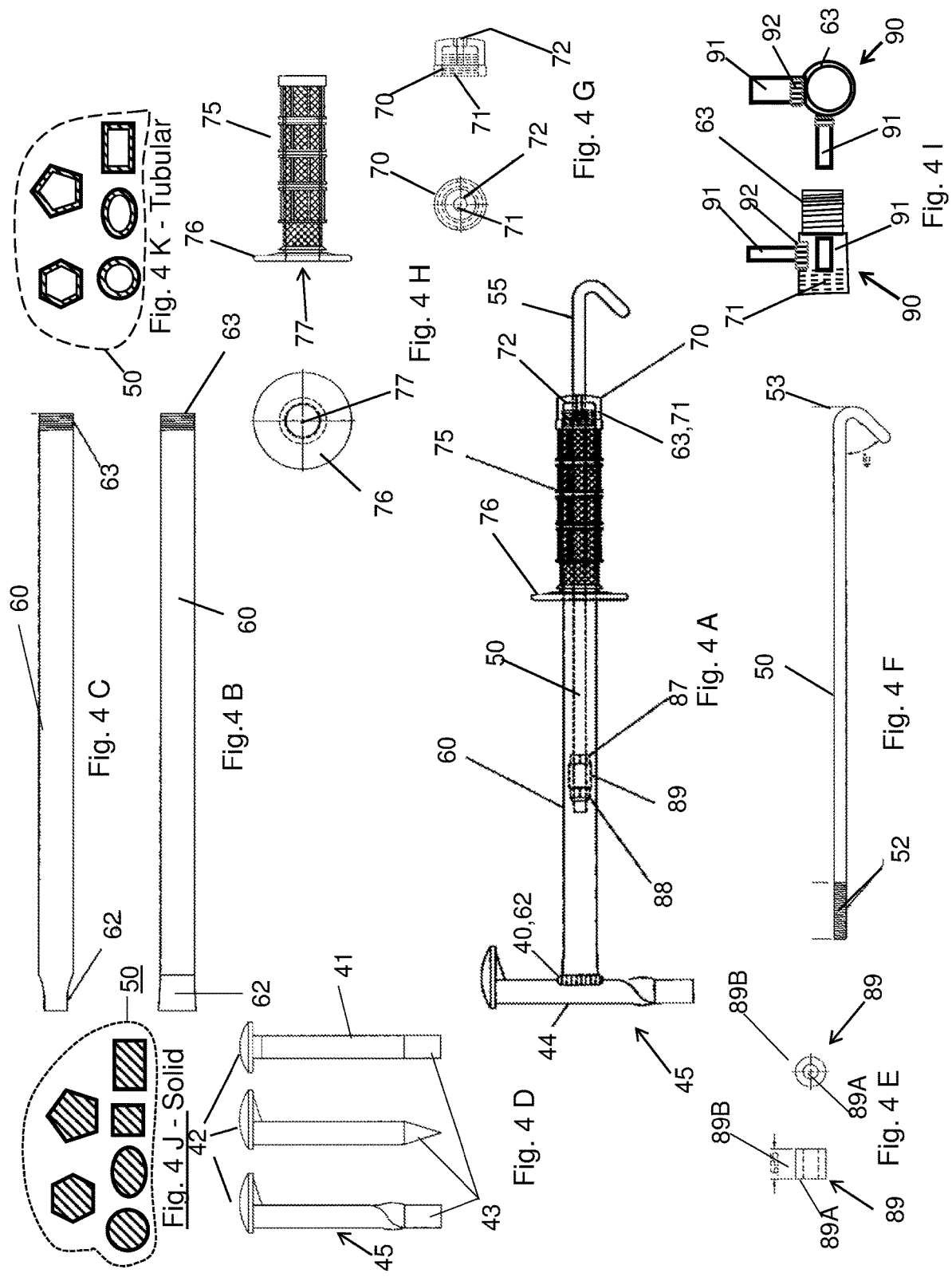

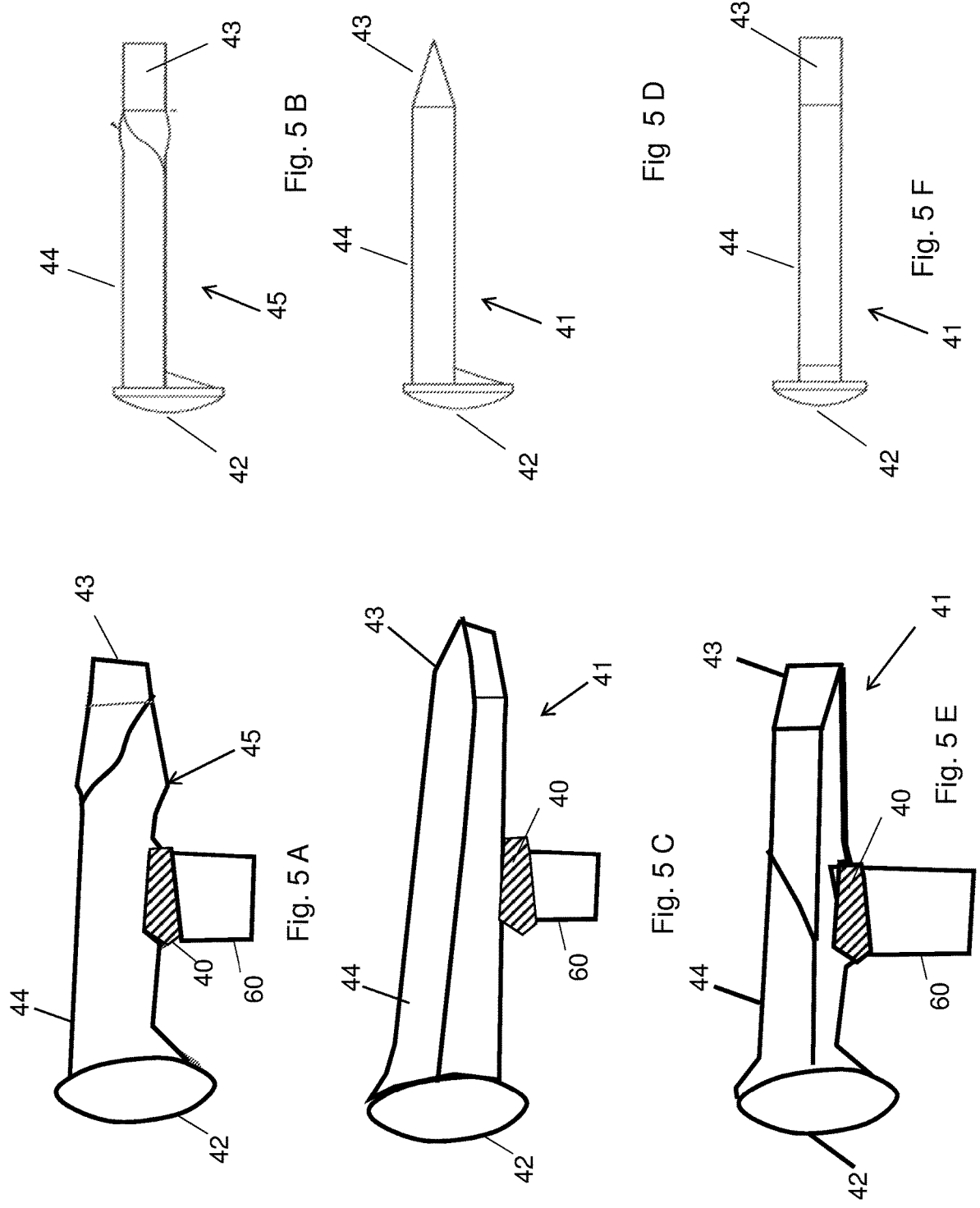

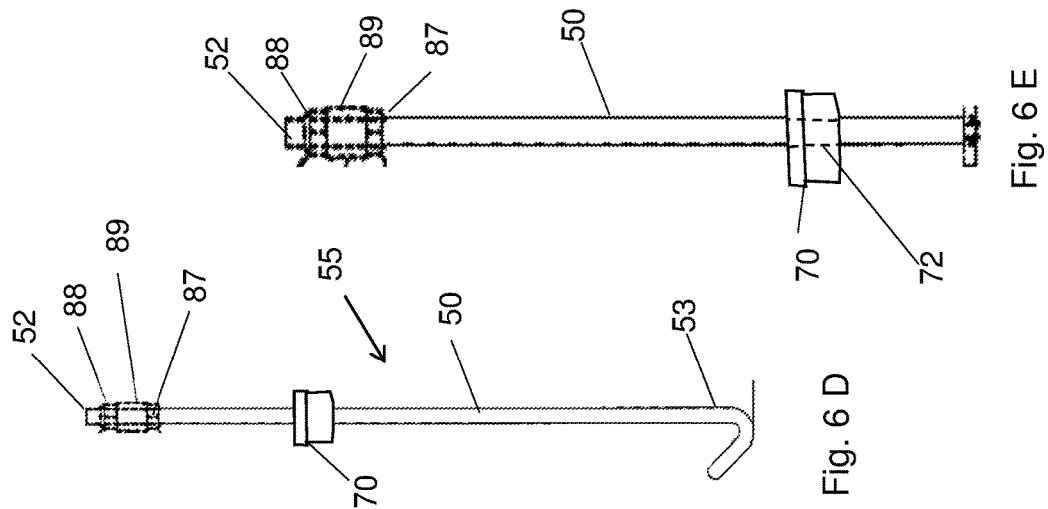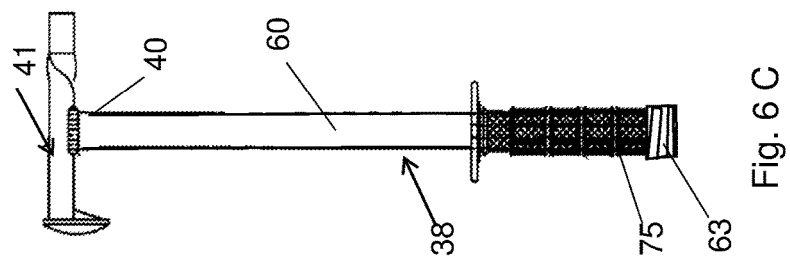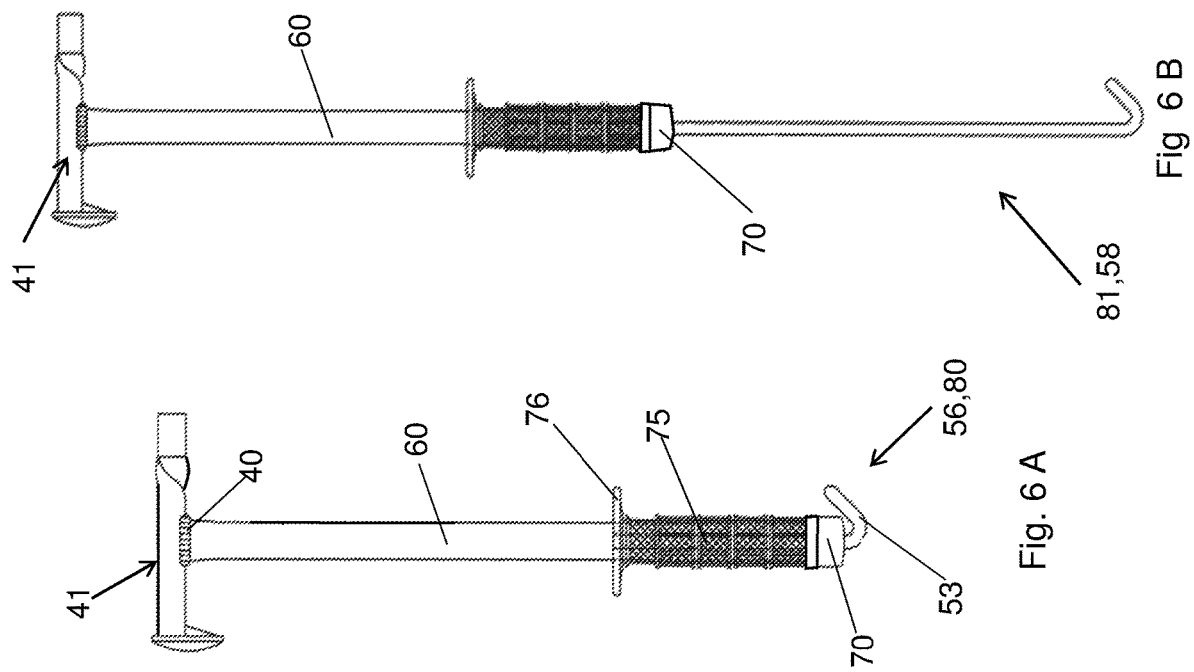

SPECIAL SEMI-TRACTOR TRUCK AND TRAILER TOOL CALLED HUCKLEBERRYS HAMMER

CROSS-REFERENCE TO RELATED APPLICATIONS

This application claims the benefit of United States Provisional Patent Application with Ser. No. 62/204,402 filed Aug. 12, 2015 by Michael L. Wade and entitled "Special semi-tractor truck and trailer tool called Huckleberry's Hammer".

FIELD OF INVENTION

This invention relates to a Special tool called Huckleberry's Hammer for Semi-truck and trailer applications. Particularly this invention relates to tools employed by truck operators and, more particularly, to such tools used to release a fifth wheel pins of a tractor/trailer assembly or the wheel adjustments and tandem axle trailer pin extractor apparatus. This tool has many uses described herein, including as an uncoupling/decoupling tool for unlocking the fifth wheel assembly to allow uncoupling/decoupling of a trailer from a tractor and also a tool for shifting the locking pins in the undercarriage of a tandem axle trailer when it is desired to shift the position of the tandem axles relative to the trailer body.

FEDERALLY SPONSORED RESEARCH

None.

SEQUENCE LISTING OR PROGRAM

None.

BACKGROUND

Field of Invention and Prior Art

As far as known, there are no Special semi-tractor truck and trailer tool called Huckleberry's Hammer or the like. It is believed that this product is unique in its design and technologies.

Background

In a normal driving and employment case, a truck operator's primary responsibility is to drive the tractor/trailer, while a truck mechanic performs repair and maintenance on such tractor/trailers. However, the truck operator is often responsible and called upon to perform duties such as disconnecting the tractor from the trailer and repositioning the wheels on the trailer. Unlike a mechanic, truck operators traditionally do not have a full complement of tools available for performing their duties. For example, the truck operator is often called on to disconnect or uncouple a fifth wheel pin employed to connect the trailer to the tractor. The fifth wheel pin is located between the tractor and the trailer above the rear tires of the tractor. The truck operator/driver is expected to bend down/over and reach between the tractor and the trailer past one set of rear tires to pull the fifth wheel pin. This action requires operators to contort themselves into an awkward position while pulling the pin and often results in the operators straining any number of body parts, such as shoulders, elbows, and wrists and especially their backs.

In addition, many truck and most semi-trailers are equipped with longitudinally-adjustable, tandem axle frame assemblies which slide in order to better distribute a load over the wheels or to support the rear of the trailer during loading. Generally, the tandem axle frame assemblies are secured to the sub-frame of the trailer by a series of heavy spring-loaded pins. The pins are spring-urged in such a manner whereby pins attempt to seat themselves within holes in a locking position in the sub-frame and tandem axle frame. A tandem lock pin release handle which extends outward of the frame is provided in order to facilitate extraction or withdrawal of the pins from the holes for tandem axle frame adjustment. When the release handle is pulled, a pulling force is exerted, thereby facilitating extraction of the pins so as to allow the tandem axle subframe to be repositioned and the pins allowed to seek appropriate holes to establish a new location of the trailer relative to the tandem axles. However, often times the immensity of the masses involved with the trailer and the tandem axles and the forces there between causes the pins to be lodged in the locking position. Thus, because the operator is incapable of applying sufficient force to extract the jammed pins, he is required to return to his cab and slightly rock the semi-truck trailer back and forth in an attempt to dislodge the pins. Operator then re-attempts to pull the release handle in order to facilitate pin withdrawal. Alternatively, operator is required to seek the help of an assistant who pulls the release handle while operator slightly rocks semi-truck trailer back and forth. On newer tandems, with springs and latch notches, some drivers can do this without additional assistance. However, two people are still often needed.

Most if not all truck semi-trailers are equipped with a sliding tandem frame which is slid to adjust the weight distribution of the cargo inside the semi-trailer. At the point on the semitrailer where the tandem wheels slide back and forth, there are normally four pins inside. These pins fit through openings in the flange-like frame on the side of the trailer box and extend to openings in the tandem frame. A handle is positioned underneath the pins and extending toward the outside of the trailer. The pins come in when the handle is pulled and the tandem axle then may slide on the trailer frame. In order for the tandem frame to slide, the holes must be lined up and the pins pulled out. If the pins are not lined up into the holes of the frame, the pins will stick and be very difficult to pull out. In this case, the semitrailer must be rocked back and forth until the pins line up. Usually the pins are pulled manually and generally two people are needed to do the job. The only known prior art device for pulling pins is a mule, which is air-operated and permanently affixed.

One may note that light tools having a thin shaft and a hook on the end thereof have been used in the past to pull fifth wheel pins, but these tools are awkward to use and store, light weight, and are used only for a single purpose: removing/pulling the fifth wheel pins.

Problem Solved

Accordingly, a need has arisen for a portable apparatus adapted for one-person application, and which is further adapted for being removably securable to a tractor trailer in order to extract adjust fifth wheels or pull the tandem lock pin release handle in a manner which is quick, easy, and efficient.

Further and commonly, the lock release lever of the tandem is located on the lower portion of the tandem assembly under the rear portion of the semi-trailer. Typically the operator must stretch to reach the lock release lever. A jerking motion is preferred however it is difficult to jerk the lock release lever because of its position. A few complex extensions are commercially available that comprise a long shaft with a hook on the end to engage the lock release lever. The shaft is long enough to allow the operator to stand beside the semi-trailer and reach in to engage the lock release lever. However, only a "jerking" action on the lock release lever is possible by moving the hook past the lock release lever and then jerking it towards the operator. Such complex and rigid devices are too long to conveniently store in the tool boxes or compartments usually available on highway tractors, and so must be hung on the exterior of the vehicle where they are subject to loss, theft, and so forth.

For further explanation, one may benefit to understand: in order to perform the aforementioned repositioning of the trailer body relative to the tandem axles, a pair of rails in combination with sliding components are longitudinally disposed on the underside of the trailer body and above the tandem axles. A carriage containing the tandem axles is adapted to slide along such rails. To lock the carriage at a particular location there along, a series of uniformly spaced, transverse bores are cooperatively spaced along the two rails. Two pairs of pegs, one pair toward the front of the tandem axle carriage and the other pair toward the rear of the tandem axle carriage, provide locking means to retain the carriage at the desired relative location.

A release handle is connected to the linkage which, when pulled, simultaneously extracts all four pins whereby the carriage can be repositioned and the pins allowed to seek appropriate bores to securely establish the new location of the trailer body relative to the tandem axles.

The difficulty with the afore described arrangement lies with the fact that the magnitude of the masses involved with the trailer body and the tandem axles and the forces there between tends to cause the pins to be jammed in the locking position. Thus, when an operator attempts to extract the pins by pulling the release handle, the operator is incapable of applying sufficient force to extract the lodged pins.

In modern day, two approaches are commonly utilized to accomplish extraction of the lodged pins.

In the first approach, the operator uses a tractor unit attached to the trailer to rock the trailer back and forth in an attempt to locate a position whereby the pins are no longer lodged and the release handle can be pulled. Sometimes several such rocking maneuvers must be conducted before the right combination is randomly discovered whereby the operator, working alone, can accomplish such repositioning. In most cases, however, such a procedure is time consuming and very frustrating to the operator.

In the second approach, the operator employs the services of an assistant. Under these circumstances, the operator rocks the trailer with the tractor unit while the assistant pulls on the release handle. Since the assistant can apply a steady pressure, the pins can be extracted more quickly than with the one-person approach. However, the use of the assistant introduces another concern of major importance. While pulling on the release handle, the assistant must unavoidably be situated near the release handle in order to apply the necessary force. Since the release handle is located in close proximity to the tandem axles, the assistant must be situated undesirably close to the wheels of the axles while the operator is causing the trailer to be rocked back and forth. Such an arrangement obviously subjects the assistant to uncertain danger and substantial risk.

Prior Art

The following are examples of prior art in this field: A U.S. Pat. No. 8,210,584 entitled "Collapsible Tool for Truck Operators" and issued to Hiltz in 2012 showed An electrical socket assembly including a socket housing having coupling and flange portions and a contact cavity that extends through the coupling and flange portions along a central axis. The coupling and flange portions have different peripheral contours that extend about the central axis. The peripheral contour of the flange portion being sized and shaped to prevent the flange portion from advancing through a thruhole of a circuit board. The socket assembly also includes a fastener that is configured to be secured to the coupling portion. The fastener and the flange portion have respective mating surfaces that face each other in opposite directions along the central axis. The respective mating surfaces are configured to grip the circuit board there between such that the socket housing has a fixed position relative to the circuit board. A conductive path exists between the power contact and the circuit board. Next, U.S. Design Pat. No. D566,495 entitled "Multipurpose Truck Tool" and issued to Hackmann in 2008 demonstrated an ornamental design for a multipurpose truck tool. Then a U.S. Pat. No. 7,347,467 entitled "Fifth Wheel Hook/Tandem Hook Release Tool" and issued to Theobald in 2008 provided a multi-purpose, hand-operated tool for use in release of a fifth wheel from a pulling or towing vehicle, for use in release of tandem pins allowing a tandem tire assembly to slide along an undercarriage of a trailer for proper weight distribution of a load, for use as a tire thumper to ensure proper inflation of tires, and for use as a spotter device when backing into visually difficult areas.

Further, U.S. Pat. No. 7,159,260 entitled "Multi-Purpose Trucker's Power-Puller Tool" and issued to Hansen in 2007 showed a multi-purpose trucker's power puller tool with a hook rod that slides in the bore of a handle, and a weighted head at an end of the handle. The weighted head provides momentum to the hooked end for yanking free stuck objects, such as a truck's fifth wheel pin. The slidable rod also allows the tool to be locked in extended or collapsed positions. The invention also allows interchangeable hook rods to be used, so that the tool may be adapted to different purposes, such as grabbing and pulling eyelets of truck load covers, or pulling chains. Then U.S. Pat. No. 6,935,664 entitled "Fifth Wheel Release Tool" and issued to McGrew et al. in 2005 demonstrated a fifth wheel release tool is a device for applying the required force for releasing the latch mechanism of the fifth wheel hitch securing a semi-trailer to a truck tractor. The release tool has a hook which is removably secured to the hitch release handle, a non-resilient line extending from the hook, a treadle or stirrup secured to the opposite end of the line from the hook, and a saddle which is removably secured to a relatively fixed structure and over or through which the flexible line runs. This assembly transfers the tensile force applied to the release handle from the horizontal to the vertical as the flexible line passes over the saddle component. A person using the present release tool need only apply one's weight to the treadle or stirrup, in order to apply sufficient force to release even a relatively sticky hitch release. Next, U.S. Pat. No. 6,634,047 entitled "Tent stake Hammer, Puller, and Ground Penetrating Dibble" and issued to Rowland in 2003 showed a camping tool for hammering in and removing tent-stakes out of the ground, and also for making holes into the ground for the tent-stakes or for breaking up very hard ground. The tool can be split into two pieces for easier storage. This includes on the upper portion, the hammerhead for hammering the tent-stakes into the ground and the ground-penetrating dibble for either making the starter hole or breaking up hard ground. Also, on the lower portion is the leverage leg, which is used for removing the tent-stakes easier by using leverage power, and the o-ring for attaching onto the tent-stakes so you can remove them. Both the o-rings and leverage leg are on the plastic cylindrical body-tube.

In addition, U.S. Pat. No. 6,322,091 entitled "Pin Retractor Operator" and issued to Lindley in 2001 is a pin retractor operator is provided for use on a trailer having a movable bogie secured to the trailer frame with pins which are retractable by pulling on a handle of a pin retractor. The pin retractor operator includes a case for engaging the bogie, a handle engager coupled to a spring both of which are within the case. A tensioner extends through the case and is coupled to the spring so that linear movement of the tensioner stores energy within the spring when the handle of the pin retractor is received in the handle engager. A regulator coupled to the case controls movement of the tensioner. Tension stored in the spring pulls on the handle of the pin retractor while urging the case against the bogie allowing the trailer to be moved relative to the bogie with the pin retractor operator attached to the bogie. Components of the tensioner are adapted to serve as a positioning mechanism. While U.S. Pat. No. 6,279,932 entitled "Lock Pin Release Device For Truck Tandem Axle" and issued to White et al. in 2001 provided and displayed a release device for a tandem axle of a semi-truck is a compressible piston and cylinder, with the piston rod extending out of one end of the cylinder and biased into an extended position by a biasing mechanism such as compressed gas in the cylinder. A latch on the cylinder is releasably engageable with an indent on the piston rod to hold it in a retracted position. A hook on the cylinder engages over the handle of a manual release rod for a truck tandem axle, with an enlarged head on the end of the piston rod bearing against part of the frame adjacent the release rod with the piston rod in the latched, retracted position. Release of the latch puts biasing force on the piston rod, urging the cylinder outwardly away from the frame to pull out the release rod. And, U.S. Pat. No. 5,626,063 entitled "Tool For Unlocking a Fifth Wheel Locking Handle" and issued to Kosab in 1997 demonstrated a tool for shifting the locking bar of a fifth wheel of a tractor from a locked position to an unlocked position includes an elongate handle having a U-shaped locking handle engaging member. The handle includes a straight portion, an offset portion, and a terminal portion having the U-shaped member affixed to its outer end. The U-shaped member engages the locking handle in overlying relation and the terminal portion underlies and engages the offset portion of the locking handle whereby when the tool is rotated, the locking handle will be shifted to the unlocked position.

U.S. Pat. No. 5,344,201 entitled "Multi-Function Tool For Truck Operators" and issued to Offin in 1994 displayed a tool for allowing an operator of a tractor/trailer vehicle to perform routine non-driving duties associated with the operation of such tractor/trailer vehicles. The tool comprises an elongate central portion, a handle portion, a hook portion, and a prying portion. The hook portion is used to displace a fifth wheel pin of the tractor/trailer vehicle to disconnect the tractor from the trailer. The prying portion is used to loosen sticky hydraulic landing gear of such vehicles. The central portion may be tapped against the tires of the tractor/trailer vehicle to check the air pressure thereof. Reflective material may be formed on the tool. Next, a U.S. Pat. No. 5,326,144 entitled "Semi-Trailer Sliding Tandem Pin" and issued to Forcier in 1994 provided and taught a pin puller, comprising a spring, a clamp, and a handle, which is used to pull the pins on the sliding tandem of a semitrailer. The pin puller may also be provided with a guard and a wire which has a flag on one end. When the pins are pulled, the flag will stick out so that the driver can see the flag emerge beyond the side of the semitrailer.

In a U.S. Design Pat. No. D330,494 entitled "Fifth Wheel Pin Puller" and issued to Eagle Jr. in 1992 is shown an ornamental design for a fifth wheel pin puller. Finally, a U.S. Pat. No. 4,050,107 entitled "Tool for Truck Operator" and issued to Parma in 1977 taught and showed a combination tool particularly adapted for use by operators of semi-trailer trucks. The tool includes an elongate hollow body of rigid material having a pivoted handle or bail on one end and a weight at the other end circumjacent the body. An axially slidable hook protrudes from the weighted end for use in operation of a fifth wheel hitch when extended. An extensible graduated depth gauge is telescopically positioned within the body at the handle end which, when extended, is a depth-type fuel gauge for checking fuel depth in truck tanks. The pivoted handle may be swung away from its axial position to permit extension of the depth gauge and a secondary tool grip is provided circumjacent to the body of the tool at the handle end thereof.

What is needed is a device which is portable so that it can realistically be used for repeated applications on numerous trailers and trucks, is adapted for a one-person application, and which is self-contained thereby avoiding the need to modify the undercarriage of existing trailers.

SUMMARY OF THE INVENTION

This invention is a Special semi-tractor truck and trailer tool called Huckleberry's Hammer—a device for Semi-tractor and tractor applications. Taught here are the ways to engage/dis-engage a fifth wheel device and a trailer/wheel device with this Special Truck Power Puller device for Semi-tractor and tractor applications. Other uses are also available with this new tool. The preferred embodiment of the Special semi-truck and trailer tool called Huckleberry's Hammer is a tool device 30 comprised of: a hammer assembly 38 with a spike head 42, shaft 44 and wedge 43; a pipe structure handle 60 with a taper at one end for attaching to assembly 38 and a means 63 for attaching to a cap 70; a means to attach the hammer assembly 38 to the pipe structure handle 60; an extendable hook assembly with a hook 53 at one end and an adjustable tube 89 to be contiguous to the inside surface of the pipe 60; and the cap 70 with a means to secure the extendable hook assembly. This is a solid multi-purpose tool with a clean appearance, and easy one hand use. It is designed and used by truck driver. It has a hammer, $5^{th}$ wheel puller, and chisel. It is designed to suit all drivers, but especially the slip-seat driver and people pulling doubles due to its compact nature and design. In a collapsed position, it fits in a backpack, tote bag, and lies on the floor beside the seat. It fits easily into the side box. With one hand and the flick of ones wrist, the hook will extend and extend with a crisp snap or simply hook to any part of one's truck or trailer frame and pull the hammer/chisel end and the hook will extend out. When done, one just pushes the hook against his truck, trailer, tire or ground until it is in collapsed position. It is that simple. This helps keep the user from reaching under the trailer with his arm at an awkward angle; which is bad for ones back, limits his power, and keeps him from getting grease on his arm and clothes, thereby keeping grease from getting all over the inside of the truck cab. The resistance on the hook is adjustable. Only one part to wear. It is easily accessible and inexpensive to replace. An alternative embodiment includes an accessory end to assist with locking tire chains in place.

The newly invented special semi-tractor truck and trailer tool called Huckleberry's Hammer may be manufactured at low volumes by very simple means and in high volume production by more complex and controlled systems.

OBJECTS AND ADVANTAGES

There are several objects and advantages of the special semi-tractor truck and trailer tool called Huckleberry's Hammer device. There are currently no known truck tool devices that are effective at providing the objects of this invention.

The following table shows some examples, but not limitations, of the objectives and benefits of the Special Truck Power Puller device for Semi-tractor and tractor applications. The objective is to provide a tool for truck operators that provides a favorable mix of the following factors:

| Item | Advantages |
| --- | --- |
| 1 | Compact/Fits into backpack, tool box, or saddlebag/side boxes on motorcycles |
| 2 | Light |
| 3 | Extends reach |
| 4 | Simple to adjust "hook slide out/flip out" |
| 5 | Made of available parts |
| 6 | Safer than current tool |
| 7 | Economical |

Finally, other advantages and additional features of the present Special semi-tractor truck and trailer tool called Huckleberry's Hammer will be more apparent from the accompanying drawings and from the full description of the device. For one skilled in the art of trucking connector devices and the like, it is readily understood that the features shown in the examples with this product are readily adapted to other types of truck and trailer connection systems and devices.

DESCRIPTION OF THE DRAWINGS—FIGURES

The accompanying drawings, which are incorporated in and constitute a part of this specification, illustrate an embodiment of the Special semi-tractor truck and trailer tool called Huckleberry's Hammer device that is preferred. The drawings together with the summary description given above and a detailed description given below serve to explain the principles of the Special semi-tractor truck and trailer tool called Huckleberry's Hammer device. It is understood, however, that the Special semi-tractor truck and trailer tool called Huckleberry's Hammer device is not limited to only the precise arrangements and instrumentalities shown.

FIGS. 1 A through 1 C are sketches of the special truck and trailer tool called Huckleberry's Hammer.

FIG. 2 is a sketch of the special truck and trailer tool device with components and features noted.

FIGS. 3 A through 3 C are sketches of the truck and trailer tool in a collapsed, partially extended and fully extended position with the components and feature shown from generally a top view.

FIGS. 4 A through 4 K are sketches of the various components in the assembly of the truck and trailer tool called Huckleberry's Hammer.

FIGS. 5 A through 5 F are sketches of the head and handle assembly of the truck and trailer tool.

FIG. 6 A through 6 E are sketches of prototype assemblies for the truck and trailer tool called Huckleberry Hammer.

DESCRIPTION OF THE DRAWINGS—REFERENCE NUMERALS

The following list refers to the drawings:

TABLE B

Reference numbers

| Ref # | Description |
| --- | --- |
| 30 | Huckleberry Hammer truck and trailer tool |
| 35 | Array of parts to assemble the hammer 30 |
| 38 | Hammer assembly |
| 40 | Means for securely attaching pipe 60 to spike 41 |
| 41 | Railroad spike |
| 42 | Spike head |
| 43 | Spike wedge |
| 44 | Spike shaft |
| 45 | Twisted shaft |
| 50 | Extendable hook structure |
| 51 | Means for removeably attaching such as threads and nut or the like |
| 52 | Threaded end 52 with means 51 |
| 53 | Hook at end opposite threads |
| 55 | Hook assembly |
| 56 | Hook assembly collapsed |
| 57 | Hook assembly partially extended |
| 58 | Hook assembly extended |
| 60 | Iron pipe structure |
| 62 | Taper for attaching to spike |
| 63 | Means 63 for attaching to cap such as external threads or the like to the iron pipe 60 or to the Chain cam configuration 90 |
| 70 | Cap |
| 71 | Internal means 71 to removably attach cap 70 or chain cam 90 to pipe 60 |
| 72 | Aperture 72 through cap 70 for hook assembly 55 |
| 75 | Handle/grip |
| 76 | Flange 76 of grip 75 |
| 77 | Aperture/opening for pipe handle 60 |
| 80 | Prototype not extended hook |
| 81 | Prototype extended hook |
| 87 | Threaded nut or attachment means - hook end |
| 88 | Threaded nut and adjustment means - straight end |
| 89 | Fuel line (neoprene tube or equal) |
| 89A | Tube inner aperture |
| 89B | Tube outer surface |
| 90 | Chain cam configuration 90 |
| 91 | Chain Lugs 91 |
| 92 | Means for securely attaching chain lugs 91 to chain cam configuration 90 |

DETAILED DESCRIPTION OF PREFERRED EMBODIMENT

The present development is a special semi-truck and trailer tool called Huckleberry's Hammer device. Particularly this invention relates to a Special tool called Huckleberry's Hammer for Semi-truck and trailer applications. Particularly this invention relates to tools employed by truck operators and, more particularly, to such tools used to release a fifth wheel pins of a tractor/trailer assembly or the wheel adjustments and tandem axle trailer pin extractor apparatus. This tool has many uses described herein, including as an uncoupling/decoupling tool for unlocking the fifth wheel assembly to allow uncoupling/decoupling of a trailer from a tractor and also a tool for shifting the locking pins in the undercarriage of a tandem axle trailer when it is desired to shift the position of the tandem axles relative to the trailer body. This may be as an original equipment option or an add-on system sold in the equipment aftermarket.

The advantages for the special semi-tractor truck and trailer tool called Huckleberry's Hammer device 30 for Semi-truck and trailer applications are listed above in the introduction. Succinctly the benefits are that the device:
1. Compact/Fits into backpack or tool box, or saddlebag/side boxes on motorcycles
2. Light
3. Extends reach
4. Simple to adjust "hook slide out/flip out"
5. Made of available parts
6. Safer than current tool
7. Economical The preferred embodiment of the special semi-tractor truck and trailer tool called Huckleberry's Hammer device is a tool device 30 comprised of: a hammer assembly 38 with a spike head 42, shaft 44 and wedge 43; a pipe structure handle 60 with a taper at one end for attaching to assembly 38 and a means 63 for attaching to a cap 70; a means to attach the hammer assembly 38 to the pipe structure handle 60; an extendable hook assembly with a hook 53 at one end and an adjustable tube 89 to be contiguous to the inside surface of the pipe 60; and the cap 70 with a means to secure the extendable hook assembly. An alternative embodiment includes an accessory end to assist with locking tire chains in place.

There is shown in FIGS. 1-6 a complete description and operative embodiment of the special semi-tractor truck and trailer tool called Huckleberry's Hammer device. In the drawings and illustrations, one notes well that the FIGS. 1-6 demonstrate the general configuration and use of this product. The various example uses are in the operation and use section, below.

The accompanying drawings, which are incorporated in and constitute a part of this specification, illustrate an embodiment of the Special Truck Power Puller device 30 for Semi-tractor and tractor applications that is preferred. The drawings together with the summary description given above and a detailed description given below serve to explain the principles of the Special Truck Power Puller device 30 for Semi-tractor and tractor applications. It is understood, however, that the Special semi-tractor truck and trailer tool called Huckleberry's Hammer device 30 for Semi-tractor and tractor applications is not limited to only the precise arrangements and instrumentalities shown. Other examples of truck pulling tools and uses are still understood by one skilled in the art of truck tooling devices to be within the scope and spirit shown here.

FIGS. 1 A through 1 C are sketches of the special truck and trailer tool called Huckleberry's Hammer 30. Here are demonstrated a Huckleberry Hammer truck and trailer tool device 30; an array of parts 35 to assemble the hammer 30; hammer assembly 38; a means 40 for securely attaching pipe 60 to spike 41; a railroad spike 41; and, a twisted shaft 45. In addition is shown an extendable hook structure 50; an iron pipe structure 60; a cap 70; a handle/grip 75; a prototype 80 not extended hook; a prototype 81 extended hook; a threaded nut or attachment means 87—hook end; a threaded nut and adjustment means 88—straight end; and a fuel line 89 (neoprene tube or equal).

FIG. 2 is a sketch of the special truck and trailer tool device 30 with components and features noted. Viewed here are the Huckleberry Hammer truck and trailer tool device 30; a means 40 for securely attaching pipe 60 to spike 41; the railroad spike 41; the spike head 42; the spike wedge 43; the spike shaft 44; the twisted shaft 45; an extendable hook structure 50; a hook 53 at end opposite threads 52 iron pipe structure 60; a means 63 for attaching to cap 70 such as external threads on the like cap 70; a handle/grip 75; the threaded nut or attachment means 87—hook end; a threaded nut and adjustment means 88—straight end; and a fuel line 89 (neoprene tube or equal).

FIGS. 3 A through 3 C are sketches of the truck and trailer tool 30 in a collapsed, partially extended and fully extended position with the components and feature shown from generally a top view. Shown are the Huckleberry Hammer truck and trailer tool device 30; the means 40 for securely attaching pipe 60 to spike 41; the twisted shaft 45; the hook 53 at end opposite threads 52; the hook assembly 55; the hook assembly 55 partially extended 57; the hook assembly 55 extended 58; the iron pipe structure 60; the means 63 for attaching to cap 70 such as external threads on the like; the cap 70; the internal means 71 to removeably attach cap 70 to pipe 60; the aperture 72 through cap 70 for hook assembly 55 handle/grip 75; the threaded nut or attachment means 87—hook end; the threaded nut and adjustment means 88—straight end; and, the fuel line 89 (neoprene tube or equal).

FIGS. 4 A through 4 K are sketches of the various components in the assembly of the truck and trailer tool called Huckleberry's Hammer 30. Once again are demonstrated in these views the means 40 for securely attaching pipe 60 to spike 41; the railroad spike 41; the spike head 42; the spike wedge 43; the spike shaft 44; the twisted shaft 45; the extendable hook structure 50; the means 51 for removably attaching such as threads and nut or the like; the threaded end 52 with means 51; the hook 53 at end opposite threads 52 iron pipe structure 60; the taper for attaching to spike 62; the means 63 for attaching to cap 70 such as external threads on the like; the cap 70; the internal means 71 to removeably attach cap 70 to pipe 60; the aperture 72 through cap 70 for hook assembly 55; the handle/grip 75; the flange 76 of grip 75; the aperture/opening 77 for pipe handle 60; the threaded nut or attachment means 87—hook end; the threaded nut and adjustment means 88—straight end; the fuel line 89 (neoprene tube or equal); the tube inner aperture 89A; and the tube outer surface 89B. In FIG. 4 I is shown a chain cam configuration 90 with chain Lugs 91, a means for securely attaching chain lugs 91 to chain cam configuration 90—such as welding or brazing or the like, the internal means 71 to removably attach cap 70 or chain cam 90 to a pipe 60; and the means 63 for attaching to the cap 70 such as external threads or the like to the iron pipe 60 or to the chain cam configuration 90. As on skilled in the art of snow, ice and mud chains can appreciate, one may install tire chains as instructed from Manufacturer. Normally that means to hook back of the chains so they won't pull over tire while tightening, then hook front of tire chains so chains are snug and camber them closed with the hammer and lugs 90. Then one tightens the chains by leveraging the hammer and place the connectors onto the tight chains. Once the connectors are in place, one may release the lug device 90. One note during attaching the chains, there normally is an inside hook, and then on the chain assembly an outside cam lock/"D" link connector. The chain lug rotates about a ¼ turn, tightens the chain, then one removes the tool (normally do this done in four (4) or more places. FIG. 4 J show the solid tubes and FIG. 4 K shows the tubular cross sections of Hook assembly 55.

FIGS. 5 A through 5 F are sketches of the head and handle assembly of the truck and trailer tool. Here are presented the means 40 for securely attaching pipe 60 to spike 41; the railroad spike 41; the spike head 42; the spike wedge 43; the spike shaft 44; the twisted shaft 45; and the iron pipe structure 60.

FIG. 6 A through 6 E are sketches of prototype assemblies for the truck and trailer tool called Huckleberry's Hammer 30. These views demonstrate and present the means 40 for securely attaching pipe 60 to spike 41; the railroad spike 41; the hammer assembly 38; the extendable hook structure 50; the threaded end 52 with means 51; the hook 53 at end opposite threads 52; the hook assembly 55; the hook assembly 55 collapsed 56; the hook assembly 55 partially extended 57; the hook assembly 55 extended 58; the iron pipe structure 60; the cap 70; the aperture 72 through cap 70 for hook assembly 55; the handle/grip 75; the flange 76 of grip 75; the prototype 80 not extended hook; the prototype 81 extended hook; the threaded nut or attachment means 87—hook end; the threaded nut and adjustment means 88—straight end; and the fuel line 89 (neoprene tube or equal).

For the various Special semi-tractor truck and trailer tool called Huckleberry's Hammer device 30, various materials and configurations are anticipated. There may be one of a plethora of designs such as a solid piece of material, tubular configurations, various solid and tubular sections such as circular, oval, square, rectangular, hexagonal and various similar polygonal sections. These are shown in FIGS. 4 J and 4 K, respectively. The materials may be comprised of a metal such as steel, alloy steel, brass or aluminum and may be coated with a powder coat, paint, or other surface finishes like anodizing or oxidizing. The puller may also be made of a heavy duty, durable plastic or composite material.

The details mentioned here are exemplary and not limiting. Other specific components and manners specific to describing a Special semi-tractor truck and trailer tool called Huckleberry's Hammer device 30 may be added as a person having ordinary skill in the field of truck tools and coupling/decoupling mechanism devices and their uses well appreciates.

OPERATION OF THE PREFERRED EMBODIMENT

The special semi-tractor truck and trailer tool called Huckleberry's Hammer device 30 has been described in the above embodiment. The manner of how the device operates is described below. One may note well that the description above and the operation described here must be taken together to fully illustrate the concept of the special semi-tractor truck and trailer tool called Huckleberry's Hammer device. The preferred embodiment of the Special semi-tractor truck and trailer tool called Huckleberry's Hammer is a truck and trailer tool device 30 comprised of: a hammer assembly 38 with a spike head 42, shaft 44 and wedge 43; a pipe structure handle 60 with a taper at one end for attaching to assembly 38 and a means 63 for attaching to a cap 70; a means to attach the hammer assembly 38 to the pipe structure handle 60; an extendable hook assembly with a hook 53 at one end and an adjustable tube 89 to be contiguous to the inside surface of the pipe 60; and the cap 70 with a means to secure the extendable hook assembly. An alternative embodiment includes an accessory end to assist with locking tire chains in place.

The Special semi-tractor truck and trailer tool called Huckleberry's Hammer device 30 operates as described in the introduction above. In a normal case, a truck operator's primary responsibility is to drive the tractor/trailer. Also, the truck operator is often responsible and called upon to perform duties such as disconnecting the tractor from the trailer and repositioning the wheels on the trailer. Truck operators traditionally do not have a full complement of tools available for performing their duties. The truck operator is often called on to disconnect or uncouple a fifth wheel pin employed to connect the trailer to the tractor. See FIG. 5 in the reference drawings. The fifth wheel pin is located between the tractor and the trailer above the rear tires of the tractor. The truck operator/driver is expected to bend down/over and reach between the tractor and the trailer past one set of rear tires to pull the fifth wheel pin. In addition, many truck and most semi-trailers are equipped with longitudinally-adjustable, tandem axle frame assemblies which slide in order to better distribute a load over the wheels or to support the rear of the trailer during loading.

This is a solid multi-purpose tool with a clean appearance, and easy one hand use. It is designed and used by truck driver. It has a hammer, 5th wheel puller, and chisel. It is designed to suit all drivers, but especially the slip-seat driver and people pulling doubles due to its compact nature and design. In a collapsed position, it fits in a backpack, tote bag, and lies on the floor beside the seat. It fits easily into the side box. With one hand and the flick of ones wrist, the hook will extend and extend with a crisp snap or simply hook to any part of one's truck or trailer frame and pull the hammer/chisel end and the hook will extend out. When done, one just pushes the hook against his truck, trailer, tire or ground until it is in collapsed position. It is that simple. This helps keep the user from reaching under the trailer with his arm at an awkward angle; which is bad for ones back, limits his power, and keeps him from getting grease on his arm and clothes, thereby keeping grease from getting all over the inside of the truck cab. The resistance on the hook is adjustable. Only one part to wear. It is easily accessible and inexpensive to replace.

Another manner of use is with the chains. In FIG. 4 I is shown a chain cam configuration 90 with chain Lugs 91, a means for securely attaching chain lugs 91 to chain cam configuration 90—such as welding or brazing or the like, the internal means 71 to removably attach cap 70 or chain cam 90 to a pipe 60; and the means 63 for attaching to cap such as external threads or the like to the iron pipe 60 or to the chain cam configuration 90. As on skilled in the art of snow, ice and mud chains can appreciate, one may install tire chains as instructed from Manufacturer. Normally that means to hook back of the chains so they won't pull over tire while tightening, then hook front of tire chains so chains are snug and camber them closed with the hammer and lugs 90. Then one tightens the chains by leveraging the hammer and place the connectors onto the tight chains. Once the connectors are in place, one may release the lug device 90.

Various uses for the Special semi-tractor truck and trailer tool called Huckleberry's Hammer device 30 are anticipated. This include as examples and not as limitations:

| Item | Uses |
| --- | --- |
| 1 | Hammer - check tires to see if low on air |
| 2 | Hammer - Hit Pintle Hitches when they will not open |
| 3 | Hammer - Use to open handles on trailers |
| 4 | Hammer - Tap on frozen brake drums |
| 5 | Hammer - Close metal flanges on glad hands |
| 6 | Hammer - Tap on frozen locks on trailers |
| 7 | Hammer - Sturdy enough to throw in front of a dolly tire to hold in place |
| 8 | Hammer - Knocks burrs off side of trailer |

-continued

| Item | Uses |
|---|---|
| 9 | Hammer - Tap on trailer landing gear when stuck |
| 10 | Hammer - Tap shipping container locking device |
| 11 | Chisel - By turning chisel, it fits under the lip of the trailer to tap on the safety latch for Pintle Hitches when frozen |
| 12 | Chisel - use it to cut off excess plastic coming out of trailer doors |
| 13 | Chisel - Open up metal flanges on glad hands |
| 14 | Chisel - Chip ice off trailer parts |
| 15 | Chisel - Separate Flip Placards when stuck together |
| 16 | Chisel - Can be used to chip off of flatbed winches and straps |
| 17 | Chisel - Snug up winch straps (not for securing load) |
| 18 | Hook - Pull 5$^{th}$ wheel release on truck and dollies |
| 19 | Hook - Reach under truck or trailer for different items (i.e: air tank drain valves) |
| 20 | Pull tarps and chains |
| 21 | Hook - Pull roller doors down on trailers without climbing all the way into the trailer |
| 22 | Load/Deck bars |
| 23 | Hook and hammer - Tandem trailer connections |
| 24 | Chisel and hammer - remove side and tail lights for repair, and then tap them back in-place |

With this description it is to be understood that the special semi-truck and trailer tool called Huckleberry's Hammer device 30 is not to be limited to only the disclosed embodiment of product. The features of the special semi-truck and trailer tool called Huckleberry's Hammer device 30 are intended to cover various modifications and equivalent arrangements included within the spirit and scope of the description.

Unless defined otherwise, all technical and scientific terms used herein have the same meaning as commonly understood by one of ordinary skills in the art to which these inventions belong. Although any methods and materials similar or equivalent to those described herein can also be used in the practice or testing of the present inventions, the preferred methods and materials are now described. All patents and publications mentioned herein, including those cited in the background of the application, are hereby incorporated by reference to disclose and describe the methods and/or materials in connection with which the publications are cited.

The publications discussed herein are provided solely for their disclosure prior to the filing date of the present application. Nothing herein is to be construed as an admission that the present inventions are not entitled to antedate such publication by virtue of prior invention. Further, the dates of publication provided may be different from the actual publication dates which may need to be independently confirmed.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments can be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

Thus the scope of this invention should be determined by the appended claims and their legal equivalents. Therefore, it will be appreciated that the scope of the present invention fully encompasses other embodiments which may become obvious to those skilled in the art and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed as new and desired to be protected by Letters Patent is:

1. A tool device (30) truck made of materials and comprised of:
    (a) a hammer assembly (38) comprising:
       (1) a pipe structure (60);
       (2) a means (63) for attaching a cap (70) to the pipe structure (60) at one end;
       (3) a means for attaching a spike (41) to the pipe structure (60) at an end opposite the cap (70);
    (b) the spike (41) having a head (42) at one end, a shaft (44) and a spike wedge (43) at an opposite end;
    (c) an extendable hook assembly (55) with a hook (53) at one end and an adjustable tube hook structure (50) further comprised with an adjustable tube (89) having a tube outer surface (89B) which is to be contiguous to the inside surface of the pipe (60) and which resists the amount of extension of the hook structure (50) and further comprised with a threaded nut (87) at an end of the tube (89) near the hook (53) and a threaded nut (88) at an end of the tube (89) opposite the hook (53) whereby the threaded nuts (87,88) can compress the tube (89) and expand the outer surface (89B) to increase resistance with the inside surface of the pipe (60);
    (d) a cap (70) configured with a means for securing the extendable hook assembly (55) to the hammer assembly (38); and
    (e) a separate handle/grip (75) on the pipe structure (60) placed at the end opposite the spike (41), the handle grip (75) further comprised with a flange (76) between the spike (41) and the grip (75).

2. The device described in claim 1 wherein the pipe handle (60) is further comprised of a taper (62) at the end opposite the cap (70) for attaching to the hammer assembly (38).

3. The device described in claim 1 wherein the shaft (44) of the spike (41) is selected from the group consisting of a straight shaft (44) with the spike wedge (43) at an end opposite the head (42) and a twisted shaft (45) with the spike wedge (43) configured at ninety 90 degrees to the spike wedge on a straight shaft (44).

4. The device described in claim 1 wherein the materials are selected from a group consisting of metal, steel, alloy steel, brass, aluminum, plastic and composite materials.

5. The device described in claim 1 wherein the materials are surface coated by a method selected from a group consisting of a powder coating, a painting, anodizing a finish and an oxidizing a finish.

6. The device described in claim 1 wherein the extendable hook assembly (55) is further comprised of a hook (53) at one end and a hook structure (50) to be contiguous to the inside surface of the pipe (60).

7. The device described in claim 6 wherein the hook structure (50) is selected from a group consisting of a solid piece of material which is circular, oval, square, rectangular, hexagonal and various polygonal sections.

8. The device described in claim 6 wherein the hook structure (50) is selected from a group consisting of a tubular material which is circular, oval, square, rectangular, hexagonal and various polygonal sections.

9. The device described in claim 1 further comprised of a chain cam configuration (90) with at least two chain lugs (91), a means (92) for securely attaching the chain lugs (91) to the chain cam configuration (90), an internal means (71) to removably attach the cap (70) to the chain cam configuration (90), and a means (63) for attaching the pipe (60) to the cap (70).

10. A tool device (30) truck comprised of:
    (a) a hammer assembly (38) with a spike (41) having a head (42) at one end, a shaft (44) and a spike wedge (43) at an opposite end;
    (b) a pipe structure (60) with a taper (62) at one end for attaching to the hammer assembly (38) and a means (63) for attaching to a cap (70);
    (c) a means to attach the hammer assembly (38) to the pipe structure (60);
    (d) an extendable hook assembly (55) with a hook (53) at one end and a hook structure (50) further comprised with an adjustable tube (89) having a tube outer surface (89B) which is to be contiguous to the inside surface of the pipe (60) and which resists the amount of extension of the hook structure (50) and further comprised with a threaded nut (87) at an end of the tube (89) near the hook (53) and a threaded nut (88) at an end of the tube (89) opposite the hook (53) whereby the threaded nuts (87,88) can compress the tube (89) and expand the outer surface (89B) to increase resistance with the inside surface of the pipe (60);
    (e) the cap (70) with a means to secure the extendable hook assembly; and
    (f) a separate handle/grip (75) on the pipe structure (60) placed at the end opposite the spike (41), the handle grip (75) further comprised with a flange (76) between the spike (41) and the grip (75).

11. The device described in claim 10 further comprised of a chain cam configuration (90) with at least two chain lugs (91), a means (92) for securely attaching the chain lugs (91) to the chain cam configuration (90), an internal means (71) to removably attach the cap (70) to the chain cam configuration (90), and a means (63) for attaching the pipe (60) to the cap (70).

* * * * *